United States Patent
Kim et al.

(10) Patent No.: US 10,928,702 B2
(45) Date of Patent: Feb. 23, 2021

(54) PORTABLE ELECTRONIC APPARATUS AND CAMERA MODULE

(71) Applicant: Samsung Electro-Mechanics Co., Ltd., Suwon-si (KR)

(72) Inventors: Po Chul Kim, Suwon-si (KR); Jung Seok Lee, Suwon-si (KR); Yeun Ho Jung, Suwon-si (KR); Jae Hyuk Kim, Suwon-si (KR); Sung Ho Kang, Suwon-si (KR); Ick Chan Shim, Suwon-si (KR); Yoo Chang Kim, Suwon-si (KR); Sung Hoon Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 193 days.

(21) Appl. No.: 16/182,658

(22) Filed: Nov. 7, 2018

(65) Prior Publication Data

US 2019/0294027 A1 Sep. 26, 2019

(30) Foreign Application Priority Data

Mar. 20, 2018 (KR) .................. 10-2018-0032031
Jul. 12, 2018 (KR) .................. 10-2018-0081037

(51) Int. Cl.
*G03B 5/04* (2006.01)
*G02B 7/09* (2006.01)
(Continued)

(52) U.S. Cl.
CPC ............ *G03B 5/04* (2013.01); *G02B 7/09* (2013.01); *G02B 27/646* (2013.01); *G03B 13/36* (2013.01);
(Continued)

(58) Field of Classification Search
CPC . G02B 7/00; G02B 7/02; G02B 7/021; G02B 7/09
See application file for complete search history.

(56) References Cited

U.S. PATENT DOCUMENTS 9,319,574 B2  4/2016  Shin et al.
10,747,013 B2  8/2020  Lim
(Continued)

FOREIGN PATENT DOCUMENTS

CN  104238238 A  12/2014
CN  105911795 A  8/2016
(Continued)

OTHER PUBLICATIONS

Chinese Office Action dated Dec. 1, 2020 in counterpart Chinese Patent Application No. 201910109993.9 (8 pages in English, 9 pages in Chinese).

*Primary Examiner* — Robert E. Tallman
(74) *Attorney, Agent, or Firm* — NSIP Law

(57) ABSTRACT

A camera module includes a carrier configured to move in an optical axis direction, a frame and a lens holder disposed in the carrier in the optical axis direction and configured to move together with the carrier in the optical axis direction, a first ball member disposed between the carrier and the frame, a second ball member disposed between the frame and the lens holder, and a third ball member disposed between the carrier and the lens holder. The frame and the lens holder are configured to move together in a first axis direction perpendicular to the optical axis direction. The lens holder is configured to move relatively with respect to the frame in a second axis direction perpendicular to the first axis direction, and the third ball member has more contact points with the carrier than the first ball member.

19 Claims, 9 Drawing Sheets

(51) Int. Cl.
  *G03B 13/36* (2006.01)
  *G02B 27/64* (2006.01)
  *H04N 5/232* (2006.01)
  *H04N 5/225* (2006.01)

(52) U.S. Cl.
  CPC .... *G03B 2205/0015* (2013.01); *H04N 5/2254* (2013.01); *H04N 5/22525* (2018.08); *H04N 5/23287* (2013.01)

(56) References Cited

U.S. PATENT DOCUMENTS

| | | |
|---|---|---|
| 2011/0013283 A1 | 1/2011 | Sato |
| 2012/0236423 A1 | 9/2012 | Uno et al. |
| 2014/0086568 A1 | 3/2014 | Nomura et al. |
| 2014/0362284 A1* | 12/2014 | Shin .................. G02B 27/646 |
| | | 348/373 |
| 2015/0116514 A1 | 4/2015 | Kim et al. |
| 2015/0296112 A1 | 10/2015 | Park et al. |
| 2017/0052387 A1 | 2/2017 | Yu et al. |
| 2017/0139225 A1 | 5/2017 | Lim |

FOREIGN PATENT DOCUMENTS

| | | |
|---|---|---|
| CN | 106462029 A | 2/2017 |
| CN | 106707454 A | 5/2017 |
| JP | 5880021 B2 | 3/2016 |
| KR | 10-2015-0118005 A | 10/2015 |
| KR | 10-1730010 B1 | 4/2017 |
| KR | 10-2017-0056387 A | 5/2017 |

* cited by examiner

I-I'

II-II'

PORTABLE ELECTRONIC APPARATUS AND CAMERA MODULE

CROSS-REFERENCE TO RELATED APPLICATIONS

This application claims the benefit under 35 USC 119(a) of Korean Patent Application Nos. 10-2018-0032031 filed on Mar. 20, 2018, and 10-2018-0081037 filed on Jul. 12, 2018, in the Korean Intellectual Property Office, the entire disclosures of which are incorporated herein by reference for all purposes.

BACKGROUND

1. Field

This application relates to a camera module.

2. Description of the Background

Recently, camera modules have been employed in mobile telecommunications terminals such as smartphones, tablet PCs, laptop computers and the like.

An autofocusing function and a shake correction function have been employed in such camera modules to generate high-resolution images.

Mobile telecommunications terminals and camera modules are decreasing in size, but require actuators for moving lenses in various directions to implement the autofocusing function and the shake correction function. Such actuators make it difficult to decrease a size of such camera modules.

When a ball bearing is employed to guide the movement of a lens, the ball bearing may be vulnerable to force transferred from external impacts due to being conventionally configured to be in point contact with another member.

In particular, when a camera module is decreased in size, internal components of the camera module may be increasingly damaged by external impacts.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes a carrier configured to move in an optical axis direction, a frame and a lens holder disposed in the carrier in the optical axis direction and configured to move together with the carrier in the optical axis direction, a first ball member disposed between the carrier and the frame, a second ball member disposed between the frame and the lens holder, and a third ball member disposed between the carrier and the lens holder. The frame and the lens holder are configured to move together in a first axis direction, perpendicular to the optical axis direction. The lens holder is configured to move relatively with respect to the frame in a second axis direction, perpendicular to the first axis direction, and the third ball member has more contact points with the carrier than the first ball member.

The first ball member may be disposed to be movable in a rolling motion in the first axis direction to guide a movement of the frame, the second ball member may be disposed to be movable in a rolling motion in the second axis direction to guide the movement of the lens holder, and the third ball member may be disposed to be movable in a rotational motion to support the movements of the lens holder in the first axis direction and in the second axis direction.

The first ball member may be in two-point contact with the carrier, and the third ball member may be in at least three-point contact with the carrier.

The carrier may include an accommodation groove accommodating the third ball member therein, and the accommodation groove may include at least three bottom surfaces, the at least three bottom surfaces being respectively inclined with respect to the optical axis direction.

The accommodation groove may have a cross-sectional shape of a polygonal pyramid with an open bottom surface.

The accommodation groove may have a cross-sectional shape of a quadrangular pyramid with an open bottom surface, the third ball member and the accommodation groove may be in four-point contact with each other, and one of lines connecting opposite contact points may be disposed in the first axis direction and another line may be disposed in the second axis direction.

Each of the carrier and the lens holder may include an accommodation groove, disposed in surfaces opposite to each other in the optical axis direction, to accommodate the third ball member, and each of the accommodation grooves may have at least three bottom surfaces respectively inclined with respect to the optical axis direction.

The camera module may be a portable electronic apparatus and further include an image sensor configured to convert light incident through a lens barrel disposed in the lens holder to an electrical signal, and a display unit disposed on a surface of the portable electronic apparatus to display an image based on the electrical signal.

In another general aspect, a camera module includes a carrier configured to move in an optical axis direction, a frame and a lens holder disposed in the carrier in the optical axis direction and configured to move together with the carrier in the optical axis direction, a lens barrel fixedly inserted into the lens holder, a first ball member disposed between the carrier and the frame and configured to guide the frame in such a manner that the frame and the lens holder move in a first axis direction perpendicular to the optical axis direction, a second ball member disposed between the frame and the lens holder, and configured to guide the lens holder in such a manner that the lens holder moves in a second axis direction, perpendicular to the first axis direction, and a third ball member disposed between the carrier and the lens holder and configured to support the movements of the lens holder in the first axis direction and the second axis direction, and the third ball member has more contact points with the carrier than the first ball member.

The carrier may include an accommodation groove accommodating the third ball member therein, and the third ball member may be restricted from a translational motion and allowed to rotate while being in contact with the accommodation groove.

The accommodation groove may have a hemispherical shape.

The first ball member may be in two-point contact with the carrier and the third ball member may be in surface-contact with the carrier.

A curvature of a bottom surface of the accommodation groove may correspond to a curvature of the third ball member.

The third ball member may be in line-contact with the carrier.

A curvature of a bottom surface of the accommodation groove may be greater than a curvature of the third ball member.

The camera module may be a portable electronic apparatus and further include an image sensor configured to convert light incident through the lens barrel to an electrical signal, and a display unit disposed on a surface of the portable electronic apparatus to display an image based on the electrical signal.

In another general aspect, a camera module includes a carrier movable in an optical axis direction, a first ball member disposed on the carrier and rotatable in a first axis direction substantially perpendicular to the optical axis direction, a frame movable on the first ball member in the first axis direction relative to the carrier, a second ball member disposed on the frame and rotatable in a second axis direction different from the first axis direction, a third ball member disposed on the carrier, exposed through the frame, and rotatable in the first direction and the second direction, and a lens holder movable on the second and third ball members in the second axis direction relative to the frame.

The second axis direction may be substantially perpendicular to the optical axis and the first axis direction.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
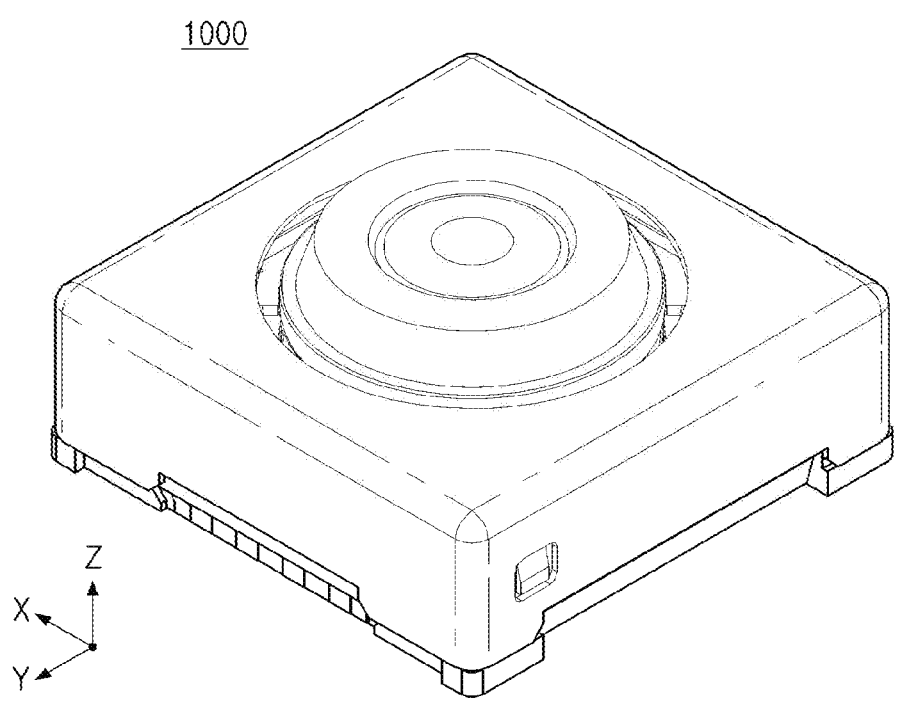
FIG. 1 is a perspective view of a camera module according to one or more examples.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. Hereinafter, while embodiments of the present disclosure will be described in detail with reference to the accompanying drawings, it is noted that examples are not limited to the same.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Herein, it is noted that use of the term "may" with respect to an example, for example, as to what an example may include or implement, means that at least one example exists in which such a feature is included or implemented while all examples are not limited thereto.

The present disclosure relates to a camera module and portable electronic apparatuses such as mobile telecommunications terminals, smartphones, and tablet PCs. An aspect of the present disclosure may provide a camera module in which sufficient strength against external impacts is secured while being decreased in size.

Figure 2:
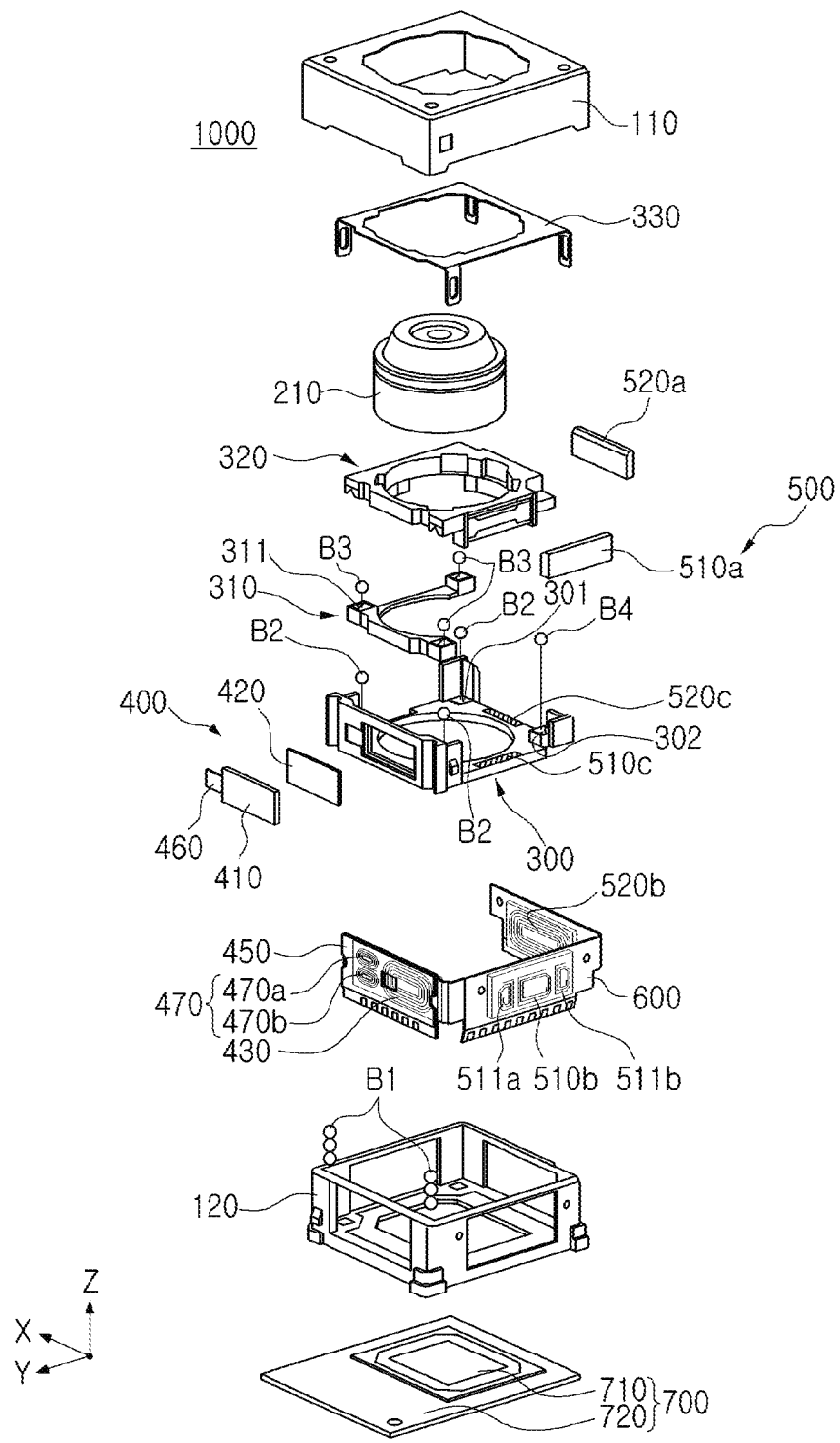
FIG. 2 is a schematic exploded perspective view of a camera module according to one or more examples.
Figure 3:
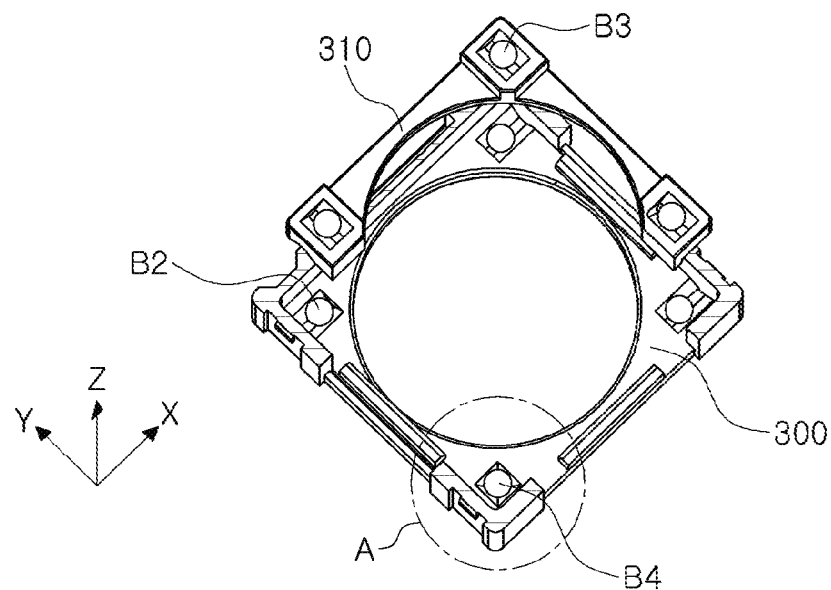
FIG. 3 is an exploded perspective view illustrating a carrier, a frame, and a ball member of a camera module according to one or more examples.

FIG. 1 is a perspective view of a camera module according to an example, FIG. 2 is a schematic exploded perspective view of a camera module according to an example, and FIG. 3 is an exploded perspective view illustrating a carrier, a frame, and a ball member of a camera module according to an example.

Referring to FIGS. 1 to 3, a camera module 1000 according to an example includes a lens barrel 210, a lens driver configured to move the lens barrel 210, an image sensor module 700 configured to convert light incident through the lens barrel 210 into an electrical signal, a housing 120 and a case 110 configured to accommodate the lens barrel 210 and the lens driver.

The lens barrel 210 may have a hollow cylindrical shape to accommodate a plurality of lenses, configured to capture an image of a subject, therein. The plurality of lenses are mounted in the lens barrel 210 along an optical axis.

The plurality of lenses may be provided in a number required according to the design of the lens barrel 210. The respective lenses have optical characteristics such as the same refractive index, different refractive indices or the like.

The lens driver is a device configured to move the lens barrel 210.

As an example, the lens driver may move the lens barrel 210 in an optical axis (z-axis) direction to adjust a focus and move the lens barrel 210 in a direction perpendicular to the optical axis (z-axis), to correct a shake when an image is captured.

The lens driver includes an autofocusing unit 400, configured to adjust a focus, and a shake correction unit 500, configured to correct a shake.

The image sensor module 700 is a device configured to convert light incident through the lens barrel 210 into an electrical signal.

As an example, the image sensor module 700 may include an image sensor 710, and a printed circuit board (PCB) 720 connected to the image sensor 710, and may further include an infrared filter.

The infrared filter may serve to block light in an infrared region among light incident through the lens barrel 210.

The image sensor 710 converts light incident through the lens barrel 210 into an electrical signal. As an example, the image sensor 710 may be a charge-coupled device (CCD) or a complementary metal-oxide semiconductor (CMOS).

Figure 11:
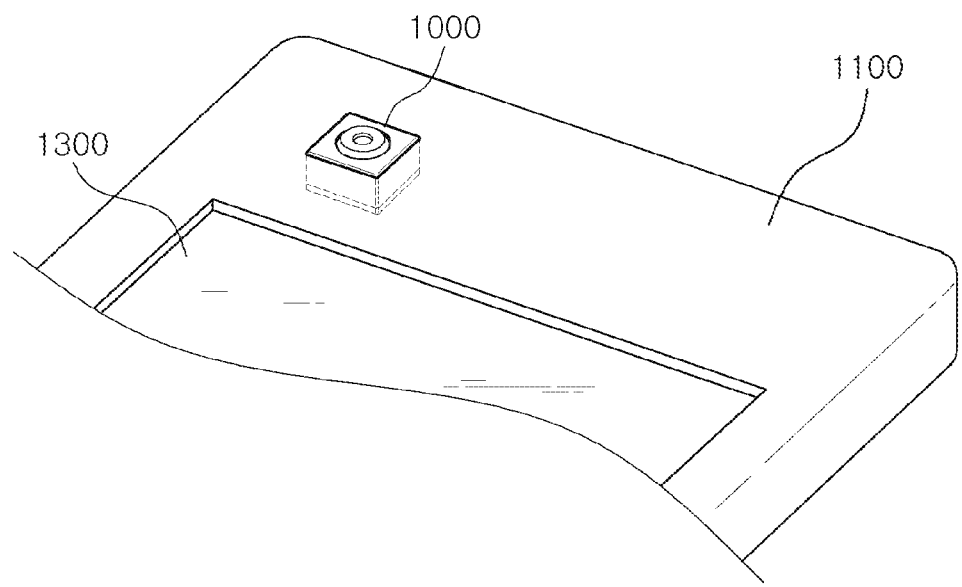
FIG. 11 is a perspective view illustrating one or more examples of a portable electronic apparatus with an example camera module.

An electrical signal converted by the image sensor 710 is output as an image, via a display unit 1300 of a portable electronic apparatus 1100 (FIG. 11).

The image sensor 710 is fixed to the PCB 720 and is electrically connected to the PCB 720 by wire bonding.

The lens barrel 210 and the lens driver are accommodated in the housing 120.

In an example, the housing 120 has an open upper portion and an open lower portion, and the lens barrel 210 and the lens driver are accommodated in an interior space of the housing 120.

The image sensor module 700 is disposed below the housing 120.

A board 600 is disposed on a side surface of the housing 120, to provide a driving signal to the autofocusing unit 400 and the shake correction unit 500. The board 600 is provided as a single board 600 covering the side surface of the housing 120.

As will be described later, openings are formed in the side surfaces of the housing 120 such that a driving coil 430 and a first position detector 470 of the autofocusing unit 400 and a first driving coil 510b, a second driving coil 520b, and a second position detector of the shake correction unit 500 are inserted therein.

The case 110 is coupled to the housing 120 and serves to protect internal components of the camera module 1000.

Also, the case 110 may serve to shield electromagnetic waves.

As an example, the case 110 may shield electrostatic waves to prevent electrostatic waves generated in the camera module 1000 from affecting other components in the portable electronic apparatus 1100 (FIG. 11).

Since various electronic components besides the camera module may be mounted in the portable electronic apparatus 1100, the case 110 may shield electrostatic waves generated in these electronic components to prevent the electrostatic waves from affecting the camera module.

The case 110 may be formed of a metal material, to be grounded to a ground pad that is provided with the PCB 720. Thus, the case 110 may shield electrostatic waves.

Referring to FIG. 2, the autofocusing unit 400 of the lens driver of the camera module 1000 according to an example will be described below.

The lens barrel 210 is moved by the lens driver to focus on a subject.

As an example, the autofocusing unit 400 is provided in the present disclosure, and is configured to move the lens barrel 210 in an optical axis (z-axis) direction.

The autofocusing unit 400 includes a carrier 300 configured to accommodate the lens barrel 210, and a magnet 410 and a driving coil 430 configured to generate driving force to move the lens barrel 210 and the carrier 300 in the optical axis (z-axis) direction.

The magnet 410 is mounted on the carrier 300. As an example, the magnet 410 may be mounted on one surface of the carrier 300.

The driving coil 430 may be a copper-foil pattern laminated and embedded in the board 600. The board 600 is mounted on a side surface of the housing 120 such that the magnet 410 and the driving coil 430 face each other in a direction perpendicular to the optical axis (z-axis).

The magnet 410 is a movable member which is mounted on the carrier 300 to move together with the carrier 300 in the optical axis (z-axis) direction, and the driving coil 430 is a fixed member fixed to the housing 120.

When power is applied to the driving coil 430, the carrier 300 may be moved in the optical axis (z-axis) direction by electromagnetic influence between the magnet 410 and the driving coil 430.

As shown in FIG. 2, since a frame 310 and a lens holder 320 are accommodated in the carrier 300, and the lens barrel 210 is mounted on the lens holder 320, the frame 310, the lens holder 320, and the lens barrel 210 are also moved in the optical axis (z-axis) direction by movement of the carrier 300.

A rolling member B1 is disposed between the carrier 300 and the housing 120 to reduce friction therebetween when the carrier 300 moves. The rolling member B1 may be in the form of a ball.

The rolling member B1 is disposed on opposite sides of the magnet 410.

A first yoke 450 is disposed to face the magnet 410 in a direction perpendicular to the optical axis (z-axis) such as the y-axis direction. As an example, the first yoke 450 may be mounted on an external surface of the board 600, a surface opposite to a surface in which the driving coil 430 is embedded. Accordingly, the first yoke 450 is disposed to face the magnet 410 with the driving coil interposed therebetween.

Attractive force acts between the first yoke 450 and the magnet 410 in the direction perpendicular to the optical axis (z-axis).

Accordingly, the rolling member B1 may be maintained in a state of contact with the carrier 300 and the housing 120 by the attractive force between the first yoke 450 and the magnet 410.

Also, the first yoke 450 serves to focus magnetic force of the magnet 410. Thus, leakage flux may be prevented from occurring.

As an example, the first yoke 450 and the magnet 410 constitute a magnetic circuit.

A second yoke 420 may be disposed between the magnet 410 and the carrier 300. The second yoke 420 may serve to focus the magnetic force of the magnet 410. Thus, leakage flux may be prevented from occurring.

As an example, the second yoke 420 and the magnet 410 constitute a magnetic circuit.

According to an example of the present disclosure, a closed loop control scheme may be used to sense and feedback a position of the lens barrel 210.

Accordingly, a first position detector 470 is provided for closed loop control. The first position detector 470 includes a plurality of coils 470a and 470b and a controller electrically connected to the plurality of coils 470a and 470b. Similar to the driving coil 430, the plurality of coils 470a and 470b may respectively be formed as a copper-foil pattern laminated and embedded in the board 600. Two coils 470a and 470b are shown in the example of FIG. 2, but three or more coils may be provided.

The first position detector 470 is disposed to face a sensing yoke 460 disposed adjacent to the magnet 410. The sensing yoke 460 may be mounted on one surface of the carrier 300 and may be an electric conductor or a magnetic material.

The first position detector 470 may be disposed to face the sensing yoke 460 in the direction perpendicular to the optical axis (z-axis). The first position detector 470 is disposed in a position adjacent to the driving coil 430.

As the carrier 300 moves in the optical axis (z-axis) direction, the sensing yoke 460 mounted on the carrier 300 also moves in the optical axis (z-axis) direction. Thus, inductance of the first position detector 470 varies. The controller may receive an inductance value from the first position detector 470 to detect a position of the lens barrel 210 (a position in the optical axis (z-axis) direction).

Accordingly, the position of the sensing yoke 460 may be detected from the variation of the inductance of the first position detector 470. As mentioned above, the sensing yoke 460 is mounted on the carrier 300, the lens barrel 210 is accommodated in the carrier 300, and the carrier 300 moves together with the lens barrel 210 in the optical axis (z-axis) direction. As a result, the position of the lens barrel 210 (the position in the optical axis (z-axis) direction) may be sensed from variations in the inductance of the first position detector 470.

The first position detector 470 may include a plurality of coils disposed in the optical axis (z-axis) direction. For example, the first position detector 470 may include the two coils 470a and 470b disposed in the optical axis (z-axis) direction.

When the sensing yoke 460 moves in the optical axis (z-axis) direction, the position of the lens barrel 210 in the optical axis (z-axis) direction may be detected more precisely using a difference between signals generated by the two coils 470a and 470b of the first position detector 470.

Inductance values of the two coils 470a and 470b may vary, depending on not only a relative position difference with the sensing yoke 460 but also on temperature variations of the surrounding environment.

However, in the present example, an exact position of the lens barrel 210 may be detected by eliminating factors depending on temperature variations of the surrounding environment.

Inductance increase and decrease directions of the two coils 470a and 470b may be different from each other, according to the movement of the sensing yoke 460. That is, when the inductance of any one coil 470a increases, the inductance of the other coil 470b may decrease.

Accordingly, when the inductance values of the two coils 470a and 470b are mutually subtracted, the factors depending on temperature variations of the surrounding environment may be eliminated to precisely detect the position of the lens barrel 210 in the optical axis (z-axis) direction.

In the present example, the first position detector 470 has been described as disposed to face the sensing yoke 460. However, the sensing yoke 460 may not be provided separately and the first position detector 470 may be disposed to face the magnet.

Next, the shake correction unit 500 in the lens driver of the camera module 1000 will now be described with reference to FIG. 2.

The shake correction unit 500 is used to correct image blurring or video shaking caused by a user's hand trembling when an image or video is captured.

For example, the shake correction unit 500 compensates for shake, caused by a user's hand trembling when an image is captured, by applying a relative displacement corresponding to the shake to the lens barrel 210.

As an example, the shake correction unit 500 corrects shake by moving the lens barrel 210 in one or more directions perpendicular to the optical axis (z-axis) such as the x-axis and y-axis directions.

The shake correction unit 500 includes a guide member configured to guide the movement of the lens barrel 210 and a plurality of magnets and a plurality of coils configured such that driving force is generated to move the guide member in the one or more directions perpendicular to the optical axis (z-axis).

The plurality of magnets may include a first magnet 510*a* and a second magnet 520*a*, and the plurality of coils may include a first driving coil 510*b* and a second driving coil 520.

The guide member includes a frame 310 and a lens holder 320. The frame 310 and the lens holder 320 are sequentially inserted into the carrier 300 in the optical axis (z-axis) direction and serve to guide the movement of the lens barrel 210.

The frame 310 and the lens holder 320 may have a space in which the lens barrel 210 is inserted. The lens barrel 210 may be fixedly inserted into the lens holder 320.

In the present example, although a guide member is employed to guide the movement of the lens barrel 210 during shake correction, the overall height of the camera module (height in the optical axis (z-axis) direction) may be prevented from increasing.

As an example, when viewed in the optical axis (z-axis) direction, the frame 310 of the guide member may have a shape in which two sides of a square are removed. Accordingly, the frame 310 may have a ']', '⌈', '⌊', or '⌊' shape (an L-shape) when viewed in the optical axis (z-axis) direction.

The first magnet 510*a* and the second magnet 520*a* may be disposed on open two sides of the frame 310, respectively. Accordingly, the disposed positions of the first magnet 510*a* and the second magnet 520*a* may not be affected by the frame 310. As a result, the overall height of the camera module may be prevented from increasing.

The frame 310 and the lens holder 320 move in the direction perpendicular to the optical axis (z-axis) with respect to the carrier 300 with driving force generated by the plurality of magnets 510*a*, 520*a* and the plurality of coils 510*b*, 520*b*.

The first magnet 510*a* and the first driving coil 510*b* generate driving force in a first axis (x-axis) direction perpendicular to the optical axis (z-axis), and the second magnet 520*a* and the second driving coil 520*b* generate driving force in a second axis (y-axis) direction perpendicular to the first axis (x-axis) direction and perpendicular to the optical axis (z-axis). That is, the plurality of magnets and the plurality of coils may generate the driving force in directions opposing each other.

The second axis (y-axis) refers to an axis perpendicular to both the optical axis (z-axis) and the first axis (x-axis).

The plurality of magnets are disposed to be orthogonal to each other in respective planes parallel to the optical axis (z-axis), and the plurality of coils are also disposed to be orthogonal to each other in respective planes parallel to the optical axis (z-axis) facing respective ones of the plurality of magnets.

The first magnet 510*a* and the second magnet 520*a* are mounted on the lens holder 320. As an example, the first magnet 510*a* and the second magnet 520*a* are mounted on side surfaces of the lens holder 320, respectively. The side surfaces of the lens holder 320 include a first surface and a second surface which are perpendicular to each other. The first magnet 510*a* and the second magnet 520*a* are disposed on the first surface and the second surface of the lens holder 320, respectively.

The first driving coil 510*b* and the second driving coil 520*b* may each be a copper-foil pattern. The board 600 is mounted on a side surface of the housing 120 such that the first magnet 510*a* and the first driving coil 510*b* face each other in the direction perpendicular to the optical axis (z-axis) and the second magnet 520*a* and the second driving coil 520*b* face each other in another direction perpendicular to the optical axis (z-axis).

The first magnet 510*a* and the second magnet 520*a* are movable members which move together with the lens holder 320 in the optical axis (z-axis) direction, and the first driving coil 510*b* and the second driving coil 520*b* are fixed members fixed to the housing 120.

In the present disclosure, a plurality of ball members are provided to support the frame 310 and the lens holder 320 of the shake correction unit 500. The plurality of ball members serve to guide the movements of the frame 310 and the lens holder 320, and consequently, the lens barrel 210. In addition, the plurality of ball members serve to maintain distances between the carrier 300 and the frame 310 and between the frame 310 and the lens holder 320.

The plurality of ball members include a first ball member B2 and a second ball member B3.

The first ball member B2 guides the movements of the frame 310, the lens holder 320, and the lens barrel 210 in the first axis (x-axis) direction, and the second ball member B3 guides the movements of the lens holder 320 and the lens barrel 210 in the second axis (y-axis) direction.

As an example, the first ball member B2 makes a rolling motion in the first axis (x-axis) direction when driving force is generated in the first axis (x-axis) direction. Thus, the first ball member B2 guides the movements of the frame 310, the lens holder 320, and the lens barrel 210 in the first axis (x-axis) direction.

The second ball member B3 makes a rolling motion in the second axis (y-axis) direction when driving force is generated in the second axis (y-axis) direction. Thus, the second ball member B3 guides the movements of the lens holder 320 and the lens barrel 210 in the second axis (y-axis) direction.

The first ball member B2 includes a plurality of ball members disposed between the carrier 300 and the frame 310, and the second ball member B3 includes a plurality of ball members disposed between the frame 310 and the lens holder 320.

A first guide groove portion 301 is formed on a surface on which the carrier 300 and the frame 310 face each other in the optical axis (z-axis) direction. The first guide groove portion 301 accommodates the first ball member B2. The first groove portion 301 includes a plurality of guide grooves corresponding to the plurality of ball members of the first ball member B2.

The first ball member B2 is accommodated in the first guide groove portion 301 to be inserted between the carrier 300 and the frame 310.

The first ball member B2 is restricted from moving in the optical axis (z-axis) direction and the second axis (y-axis) direction and is only allowed to move in the first axis (x-axis) direction while being accommodated in the first guide groove portion 301. As an example, the first ball member B2 may only make rolling motion in the first axis (x-axis) direction.

To this end, a planar shape of each of the plurality of guide grooves of the first guide groove portion 301 may be a rectangle disposed lengthwise in the first axis (x-axis) direction.

A second guide groove portion 311 is formed on a surface on which the frame 310 and the lens holder 320 face each other in the optical axis (z-axis) direction. The second guide groove portion 311 accommodates the second ball member B3. The second groove portion 311 includes a plurality of guide grooves corresponding to the plurality of ball members of the second ball member B3.

The second ball member B3 is accommodated in the second guide groove portion 311 to be inserted between the frame 310 and the lens holder 320.

The second ball member B3 is restricted from moving in the optical axis (z-axis) direction and the first axis (x-axis) direction and is only allowed to move in the second axis (y-axis) direction while being accommodated in the second guide groove portion 311. As an example, the second ball member B3 may only make a rolling motion in the second axis (y-axis) direction.

To this end, a planar shape of each of the plurality of guide grooves of the second guide groove portion 311 may be a rectangle disposed lengthwise in the second axis (y-axis) direction.

In the present disclosure, a third ball member B4 is provided between the carrier 300 and the lens holder 320 to support the movement of the lens holder 320.

The third ball member B4 supports the lens holder 320 moving in the first axis (x-axis) direction and the second axis (y-axis) direction.

As an example, the third ball member B4 rotates about the second axis (y-axis) as a rotation axis when driving force is generated in the first axis (x-axis) direction. Accordingly, the third ball member B4 does not prevent the lens holder 320 from moving in the first axis (x-axis) direction and may stably support the moving lens holder 320.

In addition, the third ball member B4 rotates about the first axis (x-axis) as a rotation axis when driving force is generated in the second axis (y-axis) direction. Accordingly, the third ball member B4 does not prevent the lens holder 320 from moving in the second axis (y-axis) direction and may stably support the moving lens holder 320.

The second ball member B3 and the third ball member B4 contact and support the lens holder 320.

On at least one of surfaces on which the carrier 300 and the lens holder 320 face each other in the optical axis (z-axis) direction, an accommodation groove 302 is formed to accommodate the third ball member B4.

The third ball member B4 is accommodated in the accommodation groove 302 to be inserted between the carrier 300 and the lens holder 320.

The third ball member B4 is restricted from moving in the optical axis (z-axis) direction and is allowed to rotate about the first axis (x-axis) and the second axis (y-axis) as rotation axes, while being accommodated in the accommodation groove 302.

To this end, the accommodation groove 302 may be concavely formed to have a cross-sectional shape of a quadrangular pyramid. Thus, the shape of the accommodation groove 302 and the shapes of the first guide groove portion 301 and the second guide groove portion 311 may be different from each other.

The first ball member B2 may only make a rolling motion in the first axis (x-axis) direction, the second ball member B3 may make rolling motion only in the second axis (y-axis) direction, and the third ball member B4 may rotate about the first axis (x-axis) and the second axis (y-axis) as rotation axes.

Accordingly, the plurality of ball members supporting the shake correction unit 500 are different in their degrees of freedom.

The term "degree of freedom" may refer to the number of independent variables needed to describe a state of motion of an object in a three-dimensional coordinate system.

In general, degrees of freedom of an object in a three-dimensional coordinate system are six (6). The movement of the object may be described by a three-directional orthogonal coordinate system and a three-directional rotating coordinate system.

As an example, in the three-dimensional coordinate system, an object may translate along the respective axes (x-axis, y-axis, and z-axis) and may rotate about the respective axes (x-axis, y-axis, and z-axis).

In the present specification, degrees of freedom may refer to the number of independent variables needed to describe the movements of the first ball member B2, the second ball member B3, and the third ball member B4 when the shake correction unit 500 is moved by driving force generated in directions perpendicular to the optical axis (z-axis), by applying power to the shake correction unit 500.

As an example, the driving force generated in the directions perpendicular to the optical axis (z-axis) allows the third ball member B4 to rotate about rotation axes as two axes (the first axis (x-axis) and the second axis (y-axis)) and allows the first ball member B2 and the second ball member B3 to roll along the first axis (x-axis) or the second axis (y-axis).

Accordingly, the degrees of freedom of the third ball member B4 are different from the degrees of freedom of the first and second ball members B2 and B3.

When the driving force is generated in the first axis (x-axis) direction, the frame 310, the lens holder 320, and the lens barrel 210 move together in the first axis (x-axis) direction.

In this case, the first ball member B2 rolls along the first axis (x-axis) and the third ball member B4 rotates about the second axis (y-axis) as a rotation axis. At this point, the second ball member B3 is restricted from moving.

When the driving force is generated in the second axis (y-axis) direction, the lens holder 320 and the lens barrel 210 move in the second axis (y-axis) direction.

In this case, the second ball member B3 rolls along the second axis (y-axis) and the third ball member B4 rotates about the first axis (x-axis) as a rotation axis. At this point, the first ball member B2 is restricted from moving.

In the present disclosure, a plurality of yokes 510c and 520c are provided such that the shake correction unit 500 and the first to third ball members B2, B3, and B4 are maintained in a state of contact.

The plurality of yokes 510c and 520c are fixed to the carrier 300, and the first magnet 510a and the second magnet 520a are disposed to face respective ones of the yokes 510c and 520c in the optical axis (z-axis) direction.

Accordingly, attractive force is generated between the plurality of yokes 510c and 520c and the first and second magnets 510a and 502a, respectively, in the optical axis (z-axis) direction.

Since the shake correction unit 500 is pressed in a direction toward the plurality of yokes 510c and 520c by the attractive force between the plurality of yokes 510c and 520c and the first and second magnets 510a and 520a, the frame 310 and the lens holder 320 of the shake correction unit 500 may be maintained in a state of contact with the first to third ball members B2, B3, and B4, respectively.

The plurality of yokes 510c and 520c include a material which may generate the attractive force between the plurality of yokes 510c and 520c and the first and second magnets 510a and 520a. As an example, the plurality of yokes 510c and 520c may be formed of a magnetic substance.

In the various examples described herein, the plurality of yokes 510c and 520c are provided such that the frame 310 and the lens holder 320 are maintained in a state of contact with the first to third ball members B2, B3, and B4. On the other hand, a stopper 330 is provided to prevent the frame 310 and the lens holder 320 from being released to the outside of the carrier 300 by an external impact.

The stopper 330 is coupled to the carrier 300 to cover at least one portion of a top surface of the lens holder 320.

The present disclosure employs a closed loop control scheme to sense and feedback a position of the lens barrel 210 during shake correction.

Accordingly, a second position detector is provided for closed loop control. The second position detector is configured to detect a position of the lens barrel 210 in the first axis (x-axis) direction and the second axis (y-axis) direction.

The second position detector includes a plurality of coils and a controller electrically connected to the plurality of coils. The controller may receive an inductance value from the plurality of coils to detect the position of the lens barrel 210 in the first axis (x-axis) direction and the second axis (y-axis) direction.

Similarly to the first driving coil 510b, the plurality of coils may each be a copper-foil pattern laminated and embedded in the board 600.

The plurality of coils may be disposed on opposite sides of the first driving coil 510b or the second driving coil 520b. As an example, when the plurality of coils include two coils, the two coils may be disposed at the opposite sides of the first driving coil 510b or the second driving coil 520b.

For ease of description, it will be described that the plurality of coils are disposed on opposite sides of the first driving coil 510b. However, the plurality of coils may be disposed on opposite sides of the second driving coil 520b.

The first magnet 510a is disposed to face the first driving coil 510b in the first axis (x-axis) direction. One side of the first magnet 510a is disposed to face a portion of one of the plurality of coils of the second position detector, and the other side of the first magnet 510a is disposed to face a portion of another of the plurality of coils of the second position detector.

Hereinafter, the coil having a portion facing one side of the first magnet 510a will be referred to as a 1-1 sensing coil 511a, and the coil having a portion facing the other side of the first magnet 510a will be referred to as a 1-2 sensing coil 511b.

As the first magnet 510a moves in the first axis (x-axis) direction and/or the second axis (y-axis) direction, inductances of the plurality of coils of the second position detector vary.

Accordingly, the position of the first magnet 510a may be detected from variations in the inductance of the plurality of coils. As mentioned above, the first magnet 510a is mounted on the lens holder 320, the lens barrel 210 is mounted on the lens holder 320, and the lens holder 320 moves together with the lens barrel 210 in the first axis (x-axis) direction and/or the second axis (y-axis) direction. As a result, the position of the lens barrel 210 (the position in the first axis (x-axis) direction and/or the second axis (y-axis) direction) may be detected from the variations in the inductance of the plurality of coils of the second position detector.

A method for detecting the position of the lens barrel 210 in the first axis (x-axis) direction will be described below.

When the lens barrel 210 moves in the first axis (x-axis) direction, increase and decrease directions of inductances of the 1-1 sensing coil 511a and the 1-2 sensing coil 511b may be identical to each other.

Accordingly, the second position detector of the camera module 1000, according to an example, is configured to use one of inductance values of the 1-1 sensing coil 511a and the 1-2 sensing coil 511b depending on the movement of the lens barrel 210 or sum the two inductance values to precisely detect the position of the lens barrel 210 in the first axis (x-axis) direction.

Next, a method for detecting the position of the lens barrel 210 in the second axis (y-axis) direction will be described below.

When the lens barrel 210 moves in the second axis (y-axis) direction, increase and decrease directions of inductances of the 1-1 sensing coil 511a and the 1-2 sensing coil 511b may be different from each other.

Accordingly, the second position detector of the camera module 1000 according to an example is configured to mutually subtract inductance values of the 1-1 sensing coil 511a and the 1-2 sensing coil 511b depending on the movement of the lens barrel 210 to precisely detect the position of the lens barrel 210 in the second axis (y-axis) direction.

Referring to FIGS. 2 and 3, the first ball member B2 is accommodated in the first guide groove portion 301 to be disposed between the carrier 300 and the frame 310. The second ball member B3 is accommodated in the second guide groove portion 311 to be disposed between the frame 310 and the lens holder 320. The third ball member B4 is accommodated in the accommodation groove 302 to be disposed between the carrier 300 and the lens holder 320.

The first to third ball members B2, B3, and B4 are configured to be in contact with two members among the carrier 300, the frame 310, and the lens holder 320.

When an external impact is applied to the camera module, stress may concentrate at a position of contact portion with each ball member. Accordingly, there is concern about damaging the stress-concentrated portion.

In particular, since the frame 310 and the lens holder 320 are attracted to the carrier 300 by the attractive force between the plurality of yokes 510c and 520c and the first and second magnets 510a and 520a, force is continuously applied to the carrier 300. Accordingly, there is concern about damaging a contact portion between each ball and the carrier 300.

Referring to FIG. 3, the first ball member B2 and the third ball member B4 are in contact with the carrier 300.

The third ball member B4 is configured to have more contact points with the carrier 300 than the first ball member B2.

As an example, the first ball member B2 is configured to be in two-point contact with the carrier 300 and the third ball member B4 is configured to be in contact with the carrier 300 at four points.

The first ball member B2 is a member that rolls only in the first axis (x-axis) direction to guide the movements of the lens barrel 210, the lens holder 320, and the frame 310 in the first axis (x-axis) direction. The third ball member B4 is a member that supports the lens holder 320, allowing the lens barrel 210 and the lens holder 320 to move stably.

As a result, the third ball member B4 supports the lens holder and is configured to be in four-point contact with the carrier 300 to disperse stress applied to the carrier 300.

Figure 4:
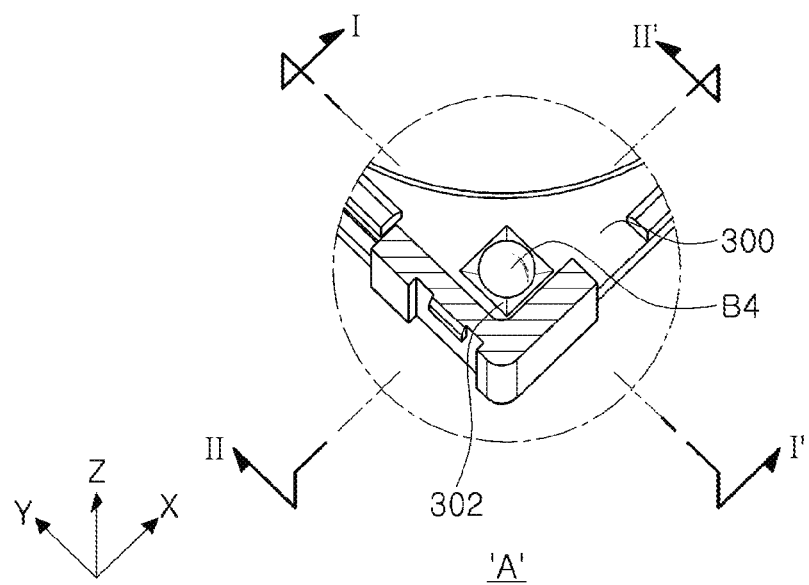
FIG. 4 is an enlarged view of a portion A of FIG. 3.
Figure 5A:
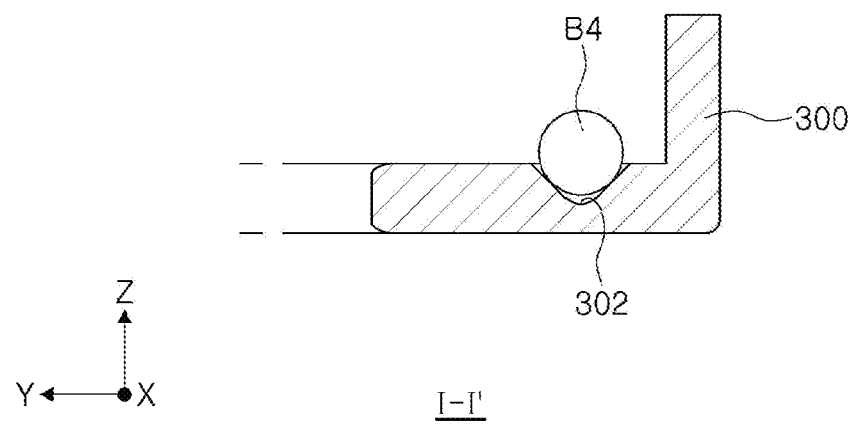
FIG. 5A is a cross-sectional view taken along line I-I' in FIG. 4.
Figure 5B:
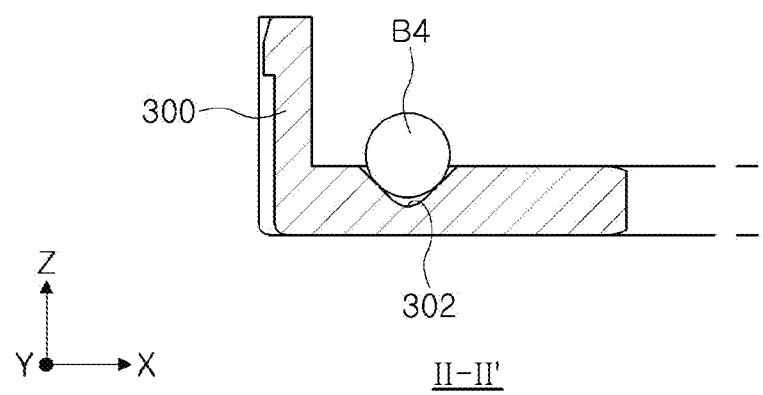
FIG. 5B is a cross-sectional view taken along line II-II' in FIG. 4.

Referring to FIGS. 4 to 5B, an accommodation groove 302 is formed in the carrier 300 to accommodate the third ball member B4 therein. The accommodation groove 302 has at least four bottom surfaces. Each of the bottom surfaces may be formed to be inclined with respect to the optical axis (z-axis) direction.

As an example, the accommodation groove 302 of the carrier 300 may be concavely formed to have a cross-sectional shape of a quadrangular pyramid. Thus, the third ball member B4 may be in four-point contact with the accommodation groove 302.

Among the four contact points of the third ball member B4 and the accommodation groove 302, two contact points are opposite to each other. One of two lines connecting the two opposite contact points may formed in the first axis (x-axis) direction, and the other line may be formed in the second axis (y-axis) direction.

Accordingly, the third ball member B4 is restricted from translational motion while being in contact with the accommodation groove 302 and may stably rotate about the first axis (x-axis) and the second axis (y-axis) as rotation axes.

Figure 6:
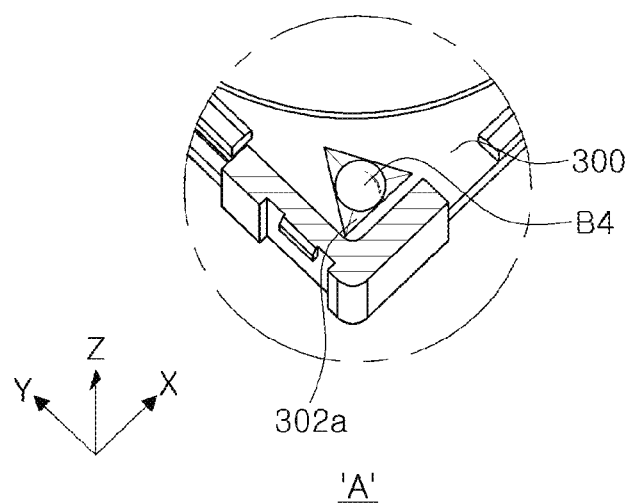
FIG. 6 illustrates a first modified example of FIG. 4.
Figure 7:
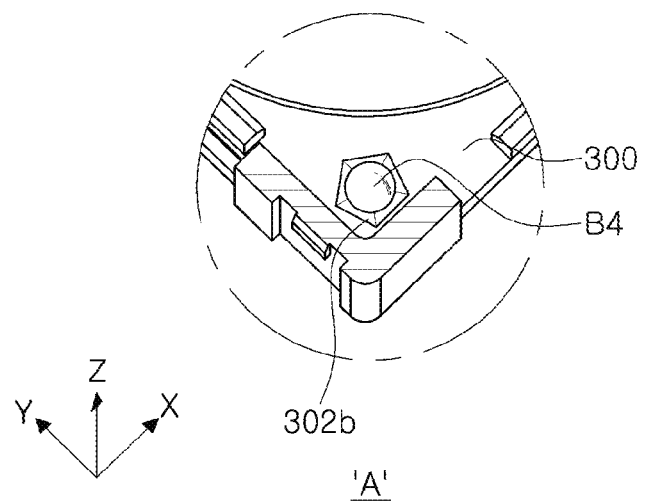
FIG. 7 illustrates a second modified example of FIG. 4.

FIG. 6 illustrates a first modified example of FIG. 4, and FIG. 7 illustrates a second modified example of FIG. 4.

Referring to FIGS. 6 and 7, a third ball member B4 has more contact points with a carrier 300 than a first ball member B2.

As an example, the first ball member B2 is in two-point contact with the carrier 300 and the third ball member B4 is in three-point or five-point contact with the carrier 300.

That is, the third ball member B4 is in three-point or five-point contact with the carrier 300 to disperse stress applied to the carrier 300.

Referring to FIG. 6, an accommodation hole 302a accommodating the third ball member B4 therein has at least three bottom surfaces. Each of the bottom surfaces may be formed to be inclined with respect to an optical axis (z-axis) direction. As an example, the accommodation groove 302a of the carrier 300 may be concavely formed to have a cross-sectional shape of a triangular pyramid.

Referring to FIG. 7, an accommodation groove 302b accommodating a third ball member B4 therein has at least five bottom surfaces. Each of the bottom surfaces may be formed to be inclined with respect to an optical axis (z-axis) direction. As an example, the accommodation groove 302b of the carrier 300 may be concavely formed to have a cross-sectional shape of a pentagonal pyramid. Thus, the third ball member B4 may be in five-point contact with the accommodation groove 302b.

The third ball member B4 may be restricted from translational motion while being in contact with either of the accommodation grooves 302a or 302b and may stably rotate.

Each of the accommodation grooves 302, 302a, and 302 of the carrier 300 may have a cross-sectional shape of a polygonal pyramid with an open bottom surface, and the shape is not limited to that of a triangular pyramid, a quadrangular pyramid, or a pentagonal pyramid.

Figure 8:
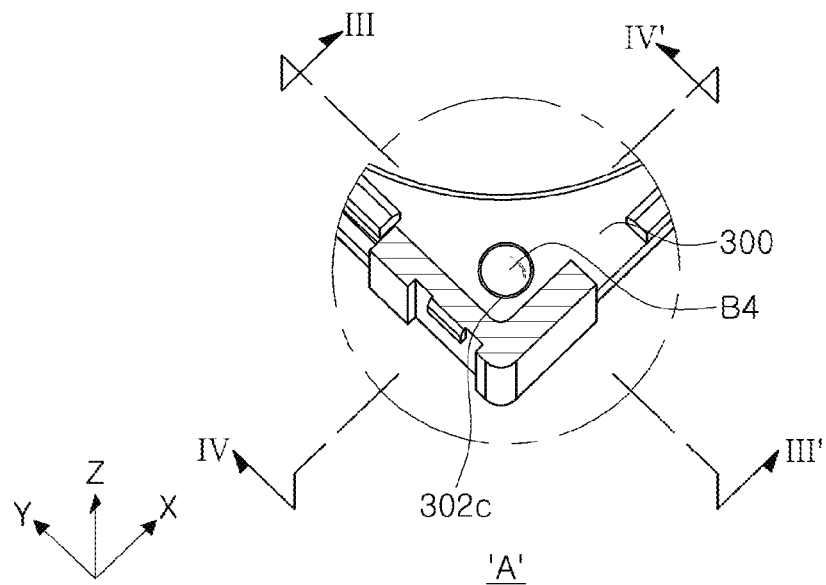
FIG. 8 illustrates a third modified example of FIG. 4.
Figure 9A:
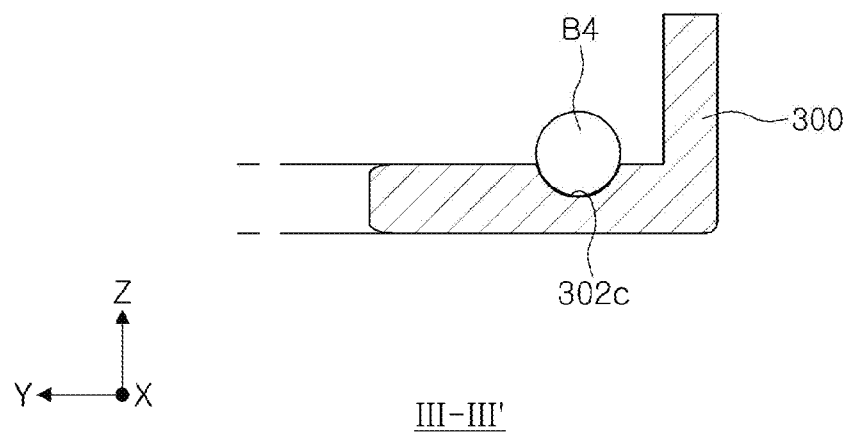
FIG. 9A is a cross-sectional view taken along line III-III' in FIG. 8.

FIG. 8 illustrates a third modified example of FIG. 4. FIG. 9A is a cross-sectional view taken along line III-III' in FIG. 8, and FIG. 9B is a cross-sectional view taken along line IV-IV' in FIG. 8.

Figure 9B:
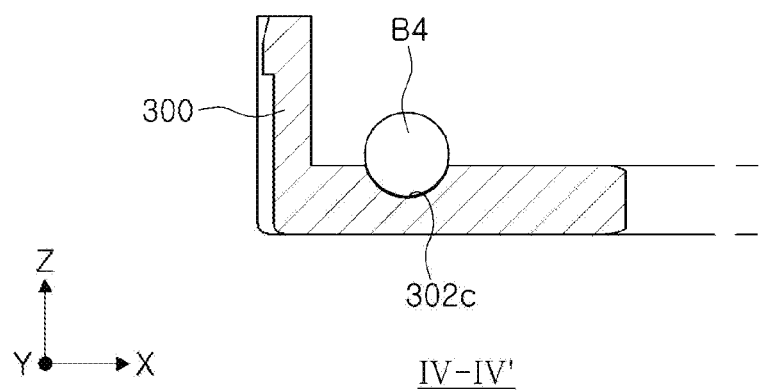
FIG. 9B is a cross-sectional view taken along line IV-IV' in FIG. 8.
Figure 10A:
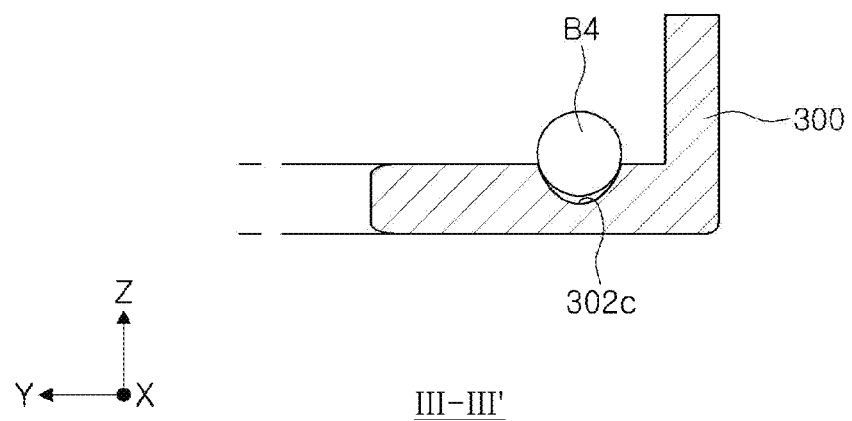
FIG. 10A illustrates a modified example of FIG. 9A.
Figure 10B:
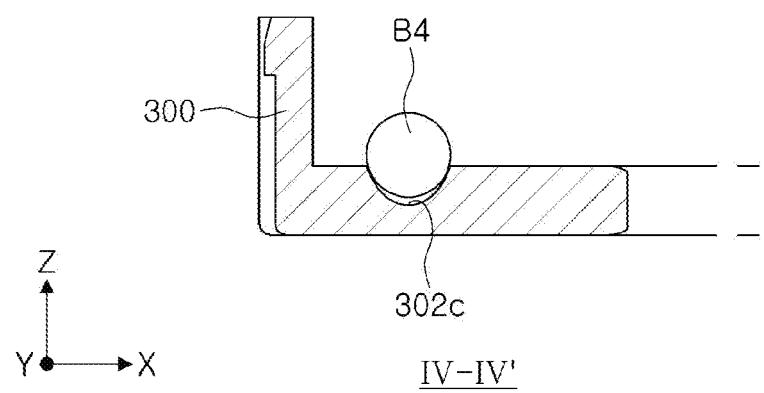
FIG. 10B illustrates a modified example of FIG. 9B.

FIG. 10A illustrates a modified example of FIG. 9A, and FIG. 10B illustrates a modified example of FIG. 9B.

Referring to FIGS. 8 to 9B, a third ball member B4 is configured to be in surface-contact with a carrier 300.

As an example, a first ball member B2 is configured to be in two-point contact with the carrier 300 and the third ball member B4 is configured to be in surface-contact with the carrier 300.

That is, the third ball member B4 is configured to be in surface-contact with the carrier 300 to disperse stress applied to the carrier 300.

Referring now to FIGS. 8, 9A and 9B, an accommodation groove 302c accommodating the third ball member B4 therein may have a hemispherical shape. A curvature of a bottom surface of the accommodation groove 302c may correspond to a curvature of the third ball member B4.

Accordingly, the third ball member B4 may be in surface-contact with the accommodation groove 302c, may be restricted from translational motion while being in contact with the accommodation groove 302c, and may rotate stably. In this case, a lubricant may be coated on the accommodation groove 302c to reduce a friction with the accommodation groove 302c during the rotation of the third ball member B4.

Referring now to FIGS. 10A and 10B, a third ball member B4 is shown in line-contact with a carrier 300.

As an example, a first ball member B2 is in two-point contact with the carrier 300 and the third ball member B4 is in line-contact with the carrier 300.

That is, the third ball member B4 is configured to be in line-contact with the carrier 300 to disperse stress applied to the carrier 300.

Continuing to refer to FIGS. 10A and 10B, an accommodation groove 302c accommodating the third ball member B4 therein may have a hemispherical shape. A curvature of a bottom surface of the accommodation groove 302c may be different from a curvature of the third ball member B4. As an example, the curvature of the bottom surface of the accommodation groove 302c may be greater than the curvature of the third ball member B4.

Accordingly, the third ball member B4 may be in line-contact with the accommodation groove 302c, may be restricted from translational motion while being in contact with the accommodation groove 302c, and may rotate stably. In this case, a lubricant may be coated on the accommodation groove 302c to reduce a friction with the accommodation groove 302c during the rotation of the third ball member B4.

Referring to FIG. 11, the camera module 1000, according to the examples described herein, may be a mobile device, such as a portable electronic apparatus 1100, and further include a display unit 1300, wherein the camera module 1000 is installed as a front camera of the portable electronic apparatus 1100 along with the display unit 1300 or as a back camera on a side of the portable electronic apparatus 1100 other than a side with the display unit 1300. As described in the various examples, an electrical signal converted by an image sensor 710 (FIG. 2) of the camera module 1000 may be output as an image via the display unit 1300 of the portable electronic apparatus 1100.

As described above, a camera module according to one or more examples may secure a sufficient strength against an external impact while reducing a size thereof.

While specific examples have been shown and described above, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
a carrier configured to move in an optical axis direction;
a frame and a lens holder disposed in the carrier in the optical axis direction and configured to move together with the carrier in the optical axis direction;
a first ball member disposed between the carrier and the frame;
a second ball member disposed between the frame and the lens holder; and
a third ball member disposed between the carrier and the lens holder,
wherein:
the frame and the lens holder are configured to move together in a first axis direction perpendicular to the optical axis direction,
the lens holder is configured to move relatively with respect to the frame in a second axis direction, perpendicular to the first axis direction, and
the third ball member has more contact points with the carrier than the first ball member.

2. The camera module of claim 1, wherein:
the first ball member is disposed to be movable in a rolling motion in the first axis direction to guide a movement of the frame,
the second ball member is disposed to be movable in a rolling motion in the second axis direction to guide the movement of the lens holder, and
the third ball member is disposed to be movable in a rotational motion to support the movements of the lens holder in the first axis direction and in the second axis direction.

3. The camera module of claim 1, wherein:
the first ball member is in two-point contact with the carrier, and the third ball member is in at least three-point contact with the carrier.

4. The camera module of claim 1, wherein:
the carrier comprises an accommodation groove accommodating the third ball member therein, and
the accommodation groove comprises at least three bottom surfaces, the at least three bottom surfaces being respectively inclined with respect to the optical axis direction.

5. The camera module of claim 4, wherein:
the accommodation groove has a cross-sectional shape of a polygonal pyramid with an open bottom surface.

6. The camera module of claim 5, wherein:
the accommodation groove has a cross-sectional shape of a quadrangular pyramid with an open bottom surface,
the third ball member and the accommodation groove are in four-point contact with each other, and
one of lines connecting opposite contact points is disposed in the first axis direction and another line is disposed in the second axis direction.

7. The camera module of claim 1, wherein:
each of the carrier and the lens holder comprises an accommodation groove, disposed in surfaces opposite to each other in the optical axis direction, to accommodate the third ball member, and
each of the accommodation grooves has at least three bottom surfaces respectively inclined with respect to the optical axis direction.

8. A portable electronic apparatus, comprising:
the camera module of claim 1 further comprising an image sensor configured to convert light incident through a lens barrel disposed in the lens holder to an electrical signal; and
a display unit disposed on a surface of the portable electronic apparatus to display an image based on the electrical signal.

9. A camera module comprising:
a carrier configured to move in an optical axis direction;
a frame and a lens holder disposed in the carrier in the optical axis direction and configured to move together with the carrier in the optical axis direction;
a lens barrel fixedly inserted into the lens holder;
a first ball member disposed between the carrier and the frame, and configured to guide the frame in such a manner that the frame and the lens holder move in a first axis direction perpendicular to the optical axis direction;
a second ball member disposed between the frame and the lens holder, and configured to guide the lens holder in such a manner that the lens holder moves in a second axis direction, perpendicular to the first axis direction; and
a third ball member disposed between the carrier and the lens holder and configured to support the movements of the lens holder in the first axis direction and the second axis direction,
wherein the third ball member has more contact points with the carrier than the first ball member.

10. The camera module of claim 9, wherein:
the carrier comprises an accommodation groove accommodating the third ball member therein, and
the third ball member is restricted from a translational motion and allowed to rotate while being in contact with the accommodation groove.

11. The camera module of claim 10, wherein:
the accommodation groove has a hemispherical shape.

12. The camera module of claim 11, wherein the first ball member is in two-point contact with the carrier and the third ball member is in surface-contact with the carrier.

13. The camera module of claim 12, wherein:
a curvature of a bottom surface of the accommodation groove corresponds to a curvature of the third ball member.

14. The camera module of claim 11, wherein:
the first ball member is in two-point contact with the carrier, and the third ball member is in line-contact with the carrier.

15. The camera module of claim 14, wherein:
a curvature of a bottom surface of the accommodation groove is greater than a curvature of the third ball member.

16. A portable electronic apparatus, comprising:
the camera module of claim 9 further comprising an image sensor configured to convert light incident through the lens barrel to an electrical signal; and
a display unit disposed on a surface of the portable electronic apparatus to display an image based on the electrical signal.

17. A camera module, comprising:
a carrier movable in an optical axis direction;
a first ball member disposed on the carrier and rotatable in a first axis direction substantially perpendicular to the optical axis direction;
a frame movable on the first ball member in the first axis direction relative to the carrier;

a second ball member disposed on the frame and rotatable in a second axis direction different from the first axis direction;
a third ball member disposed on the carrier, exposed through the frame, and rotatable in the first direction and the second direction; and
a lens holder movable on the second and third ball members in the second axis direction relative to the frame,
wherein the third ball member has more contact points with the carrier than the first ball member.

18. A portable electronic apparatus, comprising:
the camera module of claim 17 further comprising an image sensor configured to convert light incident through a lens barrel disposed in the lens holder to an electrical signal; and
a display unit disposed on a surface of the portable electronic apparatus to display an image based on the electrical signal.

19. The camera module of claim 17, wherein the second axis direction is substantially perpendicular to the optical axis and the first axis direction.

* * * * *